July 19, 1966     H. N. BLISS     3,261,094
COMBINATION IMPLEMENT ASSEMBLY
Filed Aug. 17, 1964
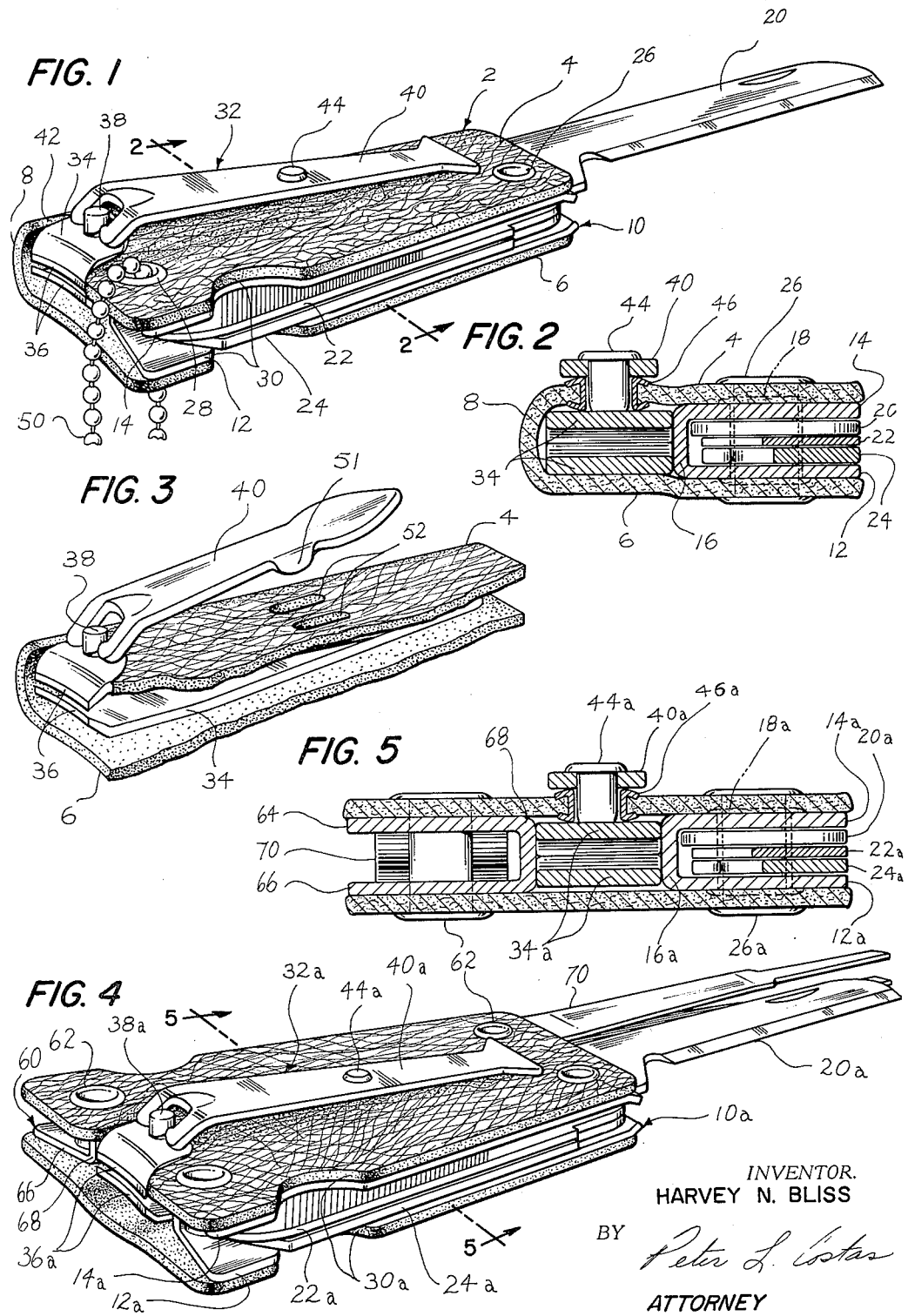
INVENTOR.
HARVEY N. BLISS
BY *Peter L. Costas*
ATTORNEY

United States Patent Office 3,261,094
Patented July 19, 1966

3,261,094
COMBINATION IMPLEMENT ASSEMBLY
Harvey N. Bliss, Windsor, Conn., assignor to The Britton Corporation, Newington, Conn., a corporation of Connecticut
Filed Aug. 17, 1964, Ser. No. 390,122
12 Claims. (Cl. 30—143)

The present invention relates to combination implement assembly and, more particularly, to such an implement assembly wherein knife-like and nail clipper implements are assembled within a casing.

It is an object of the present invention to provide a novel combination implement assembly wherein a knife-like implement and nail clipper implement are combined with a casing to provide a relatively compact unit characterized by highly attractive appearance and ease of operability.

Another object is to provide such an assembly wherein the body of the assembly provides sturdy gripping for wielding a knife blade pivoted into operative position extending outwardly therefrom.

Still another object is to provide such an assembly wherein a pair of implements having housings with pivotally mounted elements therein are combined with a nail clipper implement to provide an attractive appearance and are each easily operable.

Other objects and advantages will be readily apparent from the following detailed specification and attached drawing wherein:

FIGURE 1 is a perspective view of a combination implement assembly having a nail clipper and knife implement with a knife blade extended into operative position;

FIGURE 2 is a sectional view to an enlarged scale along the line 2—2 of FIGURE 1;

FIGURE 3 is a fragmentary perspective view of another combination implement assembly embodying the present invention with the nail clipper operating lever elevated slightly to reveal the construction thereof;

FIGURE 4 is a perspective view of a three implement assembly embodying the present invention having the pair of tweezers and knife-blade thereof extending into operative position; and FIGURE 5 is a sectional view to an enlarged scale along the line 5—5 of FIGURE 4.

It has now been found that the foregoing and related objects may be readily attained in a combination implement assembly with a casing unit having a pair of spaced generally parallel extending face portions of sheet material and means along one side edge of the face portions joining the face portions together. Within the casing unit at the opposite side edge of the face portions is a knife-like implement which generally includes a knife blade and possibly one or more additional blades pivotally mounted within an elongated housing of generally U-shaped cross-section opening outwardly of the casing unit at the opposite side edge. The housing of the implement is secured within the casing unit with the generally parallel side wall portions thereof extending adjacent the face portions and its connecting base portion facing the joining means but being spaced therefrom to define a pocket therebetween. In this manner, the blade or blades of the implement may be pivoted outwardly of the housing and casing unit into operative position extending generally longitudinally of the housing.

Slidably seated within the pocket of the casing unit is a nail clipper having a pair of superposed elongated cutter jaw elements having cooperating cutter jaws at one end thereof and fastened together at the other end thereof. The jaw elements are biased apart in the operative position to provide yieldable spacing between the cutter jaws for clipping fingernails and the like, and a pivot pin is located intermediate the length of the jaw elements and adjacent the cutter jaws. Pivotably mounted on this pivot pin is an elongated operating lever which extends generally longitudinally of the jaw elements. In the normal or at rest position of the nail clipper in the assembly, the major portion of the jaw elements including the other or fastened end is slidably received within the pocket defined by the casing unit and knife-like implement, and the operating lever extends along the outer surface of one of the casing unit face portions. To limit pivotal movement of the lever laterally of the casing unit and sliding movement of the clipper relative to the casing unit, the lever and adjacent face portion are provided with interengaging means which may be disengaged by movement of the lever generally normally outwardly from the face portion.

The casing unit and clipper are cooperatively dimensioned and configured so that the clipper fits snugly within the pocket defined between the joining means of the casing and the base portion of the knife-like implement housing. In this manner, the casing unit will be relatively rigid in the hand of a user to provide sturdy gripping for wielding a knife blade pivoted into operative position and thereby permit effective application of pressure despite the use of relatively flexible sheet material for the casing unit face portions.

In one embodiment of the present invention preferred from the standpoints of economy and ease of fabrication, the casing unit is provided simply by folding a piece of leather or like flexible sheet material so that the folded portion provides the joining means between the front and back face portions. In another embodiment, it is possible to add another type of implement having a housing of similar generally U-shaped cross-section to which one end of two separate pieces of sheet material providing the face portions are secured and which thereby acts as the joining means of the casing unit and pocket defining element thereof. In this manner, a second knife-like implement, tweezers, or other type of tool may be coupled in a convenient assembly.

Although various types of interengaging means may be employed, generally it is desirable to have a positive mechanical interlock provided by a projection on lever and a recess in the face portion, or vice versa. The projection on the operating lever may be provided by a separate pin, button or lug inserted into an appropriate recess or aperture or otherwise affixed to the lever or casing member, or it may be formed integral with the lever as a lug at an edge thereof or a lug or dimple staked out of the body thereof. The recess is desirably dimensioned to receive the projection relatively snugly and desirably is provided by an aperture in the casing member face portion which is eyeletted to avoid tearing or other injury to the sheet material.

Referring now in detail to the attached drawing, FIGURES 1 and 2 illustrate a preferred embodiment of the present invention wherein a casing unit generally designated by the numeral 2 is formed from an integral piece of leather or like sheet material folded to provide a front face portion 4, a back face portion 6 extending parallel thereto and a joining or connecting portion 8 extending between the face portions 4, 6 about the fold therein.

At the side edge of the casing unit 2 opposite the folded joining portion 8 is received a knife implement generally designated by the numeral 10 and having an elongated folded sheet metal housing of generally U-shaped cross-section with a pair of generally parallel side wall portions 12, 14 and a connecting base portion 16. Pivotably mounted with the housing of the implement 10 upon the hollow rivet 18 are a knife blade 20 and other blade members 22, 24. The implement is secured within the casing unit 2 by the eyelet 26 which extends through the hollow rivet 18 and the eyelet 28 which extends through the sidewall portions 12, 14 of the implement 10 at a point not interfering with the pivoting and storage of the blades 20, 22 and 24. The implement 10 is disposed within the casing unit 2 so that the housing opens at the side edge for access to and pivoting of the blades 20, 22, 24 into operative position fully extended outwardly of the casing unit 2 and in a position extending longitudinally of the housing as illustrated by the knife blade 20 in FIGURE 1. To facilitate gripping of the implement blades, the casing unit face portions 4, 6 have cut-outs or recesses 30 in their side edges cooperating with the conventional recesses in the implement housing sidewall portions 12, 14. The casing unit 2 is dimensioned so that the base portion 16 of the implement 10 is spaced from the joining portion 8 thereof to define a pocket therebetween.

Slidably received within this pocket is a nail clipper generally designated by the numeral 32 having a pair of superposed elongated jaw elements 34 which have cooperating cutter jaws 36 at their outer ends and are joined together at their other or inner ends (not shown). The major portion of the jaw elements including the fastened ends thereof 34 is received within the pocket of the casing element. In accordance with conventional construction, the jaw elements are tensioned so that the cutter jaws 36 are normally biased apart in their operative position to provide yieldable spacing therebetween for clipping fingernails and the like, and a pivot pin 38 extends therethrough intermediate the ends but adjacent the cutter jaws 36. Pivotably mounted on the pivot pin 38 is an elongated operating lever 40 which normally extends generally longitudinally of the jaw elements 34 and is biased thereagainst in the closed or inoperative position by the biasing pressure thereof. The pivoted end of the operating lever 40 and the pivot pin 38 are accommodated within the casing unit 2 by the recess or cut-out 42 in the front face portion 4, and the operating lever 4 extends along the outer surface of the front face portion 4.

To limit movement of the operating lever 40 laterally of the casing unit 2 and sliding movement of the clipper 32 outwardly of the casing unit 2, interengaging means are provided thereon by the small synthetic plastic stud 44 mounted in the operating lever 40 which seats in the aperture of the eyelet 46 mounted in the face portion 4. To remove the clipper 32 from the casing unit 2 it is necessary only to lift the lever 40 slightly to disengage the stud 44 from the eyelet 46 and then slide the clipper 32 outwardly.

The casing unit 2 and the clipper 32 and knife implement 10 are dimensioned and configured so that the nail clipper 32 snugly seats within the pocket between the base portion 16 of the knife implement and the joining portion 8 of the casing unit. Thus, when the casing unit 2 is grasped by a user with the knife blade 20 or other blades 22, 24 extended into operative position, the casing unit is relatively rigid despite the flexibility of the sheet material employed, thus permitting strong pressure to be applied therethrough to the blade 20. If so desired, a key chain 50 may be passed through the eyelet 28.

Turning now to the embodiment of FIGURE 3, the structure is generally similar, but different interengaging means are provided. Depending lugs 51 are formed integrally on the side edges of the operating lever 40 and extend into slots 52 in the face portion 4.

FIGURES 4 and 5 illustrate a further embodiment of the present invention having a third implement generally designated by the numeral 60 which takes the place of the joining portion 8 formed by the fold in the previous embodiments and to which are secured by eyelets 62 the two separate pieces of sheet material forming the face portions 4a, 6a of the casing unit 2a. The implement 60 has an elongated sheet metal housing of generally U-shaped cross-section with parallel extending sidewall portions 64, 66 and a connecting base portion 68. The housing opens at the side edge of the casing unit 2a opposite that at which the knife implement 10a opens and a pocket within the casing unit 2a is thus defined between the base portions 16a, 68 of the implements 10a, 60 respectively. Received pivotably within the housing of the implement 60 is a pair of tweezers 70. The casing unit 2a and the implements 10a and 60 are cooperatively dimensioned with respect to the nail clipper 32 so as to receive the nail clipper 32 snugly within the pocket defined thereby and thus provide a relatively rigid unit when gripped by the user.

If so desired, the configuration of the casing unit and various implements may be readily varied so long as the desired cooperation to achieve relatively snug fitting of the nail clipper is maintained. Moreover, the face portions of the casing unit may be adhesively bonded to the housing of the implements in addition to or in place of the eyelets, or other fastening and securing means may be employed.

In any of the several illustrated embodiments, it can be seen that the snug fitting of the clipper within the pocket ensures a relatively rigid casing unit for firm wielding of the knife blade. The clipper is maintained in its seated position by the interengaging means to prevent inadvertent disassembly, and undesired pivoting of the operating lever within a user's pocket is effectively precluded by the biasing pressure of the clipper elements which maintain the lever in its engaged position.

Thus, it can be seen that the present invention provides a novel combination implement assembly wherein knife and nail clipper elements are combined within a casing to provide a relatively compact unit characterized by highly attractive appearance and ease of operability. The body of the assembly defined by the casing provides sturdy, relatively rigid gripping for wielding a knife blade pivoted outwardly therefrom and, if so desired, a pair of housed pivoted implements may be combined with the nail clipper.

Having thus described my invention, I claim:

1. A combination implement assembly comprising a casing unit having a pair of spaced generally parallel extending face portions of sheet material and means along one side edge of said portions joining said portions; an elongated implement within said casing unit at the opposite side edge of said face portions and having an elongated housing of generally U-shaped cross-section opening outwardly of said casing unit at said opposite side edge, said housing having generally parallel side wall portions extending adjacent said face portions and a connecting base portion facing said joining means of said casing unit and spaced therefrom to define a pocket therebetween, said implement having a knife-like blade pivotally mounted within said housing; means securing said housing in said casing unit with said knife-like blade being pivotable outwardly of said housing and casing unit into operative position extending longitudinally of said housing; and a nail clipper having a pair of superposed elongated jaw elements having cooperating cutter jaws at one end thereof and fastened together at the other end thereof, said jaw elements being biased apart in operative position to provide yieldable spacing between said cutter jaws, a pivot pin intermediate the length of said jaw elements and adjacent said one end, and an elongated operating lever for said jaw elements pivotably mounted on said pivot pin and extending generally longitudinally of said jaw elements, the major portion of said jaw elements including said other end thereof being slidably received within said pocket defined by said casing unit and knife-like implement and said operating lever extending along the outer surface of one of said casing unit face portions, said operating lever and said one face portion having interengaging means to limit pivotal movement of said lever laterally of the casing unit and sliding movement of said clipper with respect to said casing unit, said interengaging means being disengageable by movement of said lever generally normally outwardly from said one face portion.

2. The combination implement assembly of claim 1 wherein said casing unit comprises an integral piece of relatively flexible material having a fold therein to provide said face portions with said joining means being the folded portion thereof.

3. The combination implement assembly of claim 1 wherein said interengaging means comprises a depending element on said operating lever and a cooperating recess in said one face portion.

4. The combination implement assembly of claim 1 wherein said interengaging means comprises a depending stud secured to said operating lever and the aperture of an eyelet-like member secured in said one face portion.

5. The combination implement assembly of claim 1 wherein said nail clipper, said casing unit and knife-like implement are cooperatively dimensioned and configured with said clipper being relatively snugly received within said pocket to provide a relatively rigid assembly when gripped by a user for wielding of a blade pivoted outwardly of said implement housing.

6. A combination implement assembly comprising a casing unit of relatively flexible sheet material with a fold therein providing a pair of spaced generally parallel extending face portions joined together along one side edge of said portions at the folded portion thereof; an elongated implement in said casing unit at the opposite side edge of said portions having an elongated housing of generally U-shaped cross-section opening outwardly of said casing unit at said opposite side edge with generally parallel side wall portions adjacent said face portions and a base portion facing said folded portion of said casing unit and spaced therefrom to define a pocket therebetween, said implement having a knife-like blade pivotally mounted within said housing; means securing said housing of said knife-like implement in said casing unit, said knife-like blade being pivotable outwardly of said housing and casing unit into operative position extending generally longitudinally of said housing; and a nail clipper having a pair of superposed elongated jaw elements having cooperating cutter jaws at one end thereof and fastened together at the other end thereof, said jaw elements being biased apart in operative position to provide yieldable spacing between said cutter jaws, a pivot pin intermediate the length of said jaw elements and adjacent said one end, and an elongated operating lever for said jaw elements pivotably mounted on said pivot pin and extending generally longitudinally of said jaw elements, the major portion of said jaw elements including said other end thereof being received within said pocket defined by said casing unit and knife-like implement and said operating lever extending along the outer surface of one of said casing unit face portions, said operating lever and said one face portion having interengaging means to limit pivotal movement of said lever laterally of the casing unit and sliding movement of said clipper with respect to said casing unit, said interengaging means being readily disengageable for withdrawing said clipper from said casing unit.

7. The combination implement assembly of claim 6 wherein said nail clipper, said casing unit and knife-like implement are cooperatively dimensioned and configured with said clipper being relatively snugly received within said pocket to provide a relatively rigid assembly when gripped by a user for wielding of a blade pivoted outwardly of said implement housing.

8. A combination implement assembly comprising a casing unit of relatively flexible sheet material with a fold therein providing a pair of spaced generally parallel extending face portions joined together along one side edge of said portions at the folded portion thereof; an elongated implement in said casing unit at the opposite side edge of said portions having an elongated housing of generally U-shaped cross-section opening outwardly of said casing unit at said opposite side edge with generally parallel side wall portions adjacent said face portions and a base portion facing said folded portion of said casing unit and spaced therefrom to define a pocket therebetween, said implement having a knife blade pivotally mounted within said housing; means securing the housing of said implement in said casing unit, said knife blade being pivotable outwardly of said housing and casing unit into operative position extending generally longitudinally of said housing; and a nail clipper having a pair of superposed elongated jaw elements having cooperating cutter jaws at one end thereof and fastened together at the other end thereof, said jaw elements being biased apart in operative position to provide yieldable spacing between said cutter jaws, a pivot pin intermediate the length of said jaw elements and adjacent said one end, and an elongated operating lever for said jaw elements pivotably mounted on said pivot pin and extending generally longitudinally of said jaw elements, the major portion of said jaw elements including said other end thereof being received within said pocket defined by the folded portion of said casing unit and knife implement and operating lever extending along the outer surface of one of said casing unit face portions, said operating lever and said one face portion having interengaging means to limit pivotal movement of said lever laterally of the casing unit and sliding movement of said clipper with respect to said casing unit, said interengaging means being disengageable by movement of said lever generally normally outwardly from said one face portion, said nail clipper and said casing unit and knife implements being cooperatively dimensioned and configured with said clipper being relatively snugly received within said pocket to provide a relatively rigid assembly when gripped by a user for wielding of a blade pivoted outwardly of said implement housing.

9. The combination implement assembly of claim 8 wherein said interengaging means comprises a depending element on said lever and a cooperating recess in said one face portion.

10. A combination implement assembly comprising a pair of spaced apart and generally parallel extending pieces of sheet material providing face portions of a casing unit; a first elongated implement between said face portions at one side edge thereof and having an elongated housing and a tool releasably retained therein; means securing said pieces of sheet material to the housing of said first implement; a second elongated implement in said casing unit between said face portions at the opposite side edge thereof having an elongated housing of generally U-shaped cross-section opening outwardly of said housing at said opposite side edge with generally parallel side wall portions adjacent said face portions and a base portion facing the housing of said first mentioned implement and spaced therefrom to define a pocket therebetween, said second implement having a knife blade pivotally mounted within said housing; means securing said pieces of sheet material to said housing of said knife implement, said knife blade being pivotable outwardly of said housing into operative position extending generally longitudinally of said housing; and a nail clipper having a pair of superposed elongated jaw elements having cooperating cutter jaws at one end thereof and joined together at the other end thereof, said jaw elements being biased apart in operative position to provide yieldable spacing between said cutter jaws, a pivot pin intermediate the length of said jaw elements and adjacent said one end, and an elongated operating lever for said jaw elements pivotably mounted on said pivot pin and extending generally longitudinally of said jaw elements, the major portion of said elements including said other end thereof being received within said pocket defined between said base portion of said knife implement and said first implement housing, said operating lever extending along the outer surface of one of said casing unit face portions, said operating lever and said one face portion having interengaging means to limit pivotal movement of said lever laterally of the casing unit and sliding movement of said clipper with respect to said casing unit, said interengaging means being disengageable by movement of said lever generally normally outwardly of said one face portion for withdrawing said clipper from said pocket.

11. The combination implement assembly of claim 10 wherein said nail clipper and said pieces of sheet material and implements are cooperatively dimensioned with said clipper being relatively snugly received within said pocket to provide a relatively rigid assembly when gripped by a user for wielding of said blade pivoted outwardly of said knife implement housing.

12. The combination implement assembly of claim 10 wherein said interengaging means comprises a depending element on said lever and a cooperating recess in said one face portion.

References Cited by the Examiner
UNITED STATES PATENTS

| | | | |
|---|---|---|---|
| 2,630,212 | 3/1953 | Mosch | 132—73.5 X |
| 2,704,398 | 3/1955 | Hunt | 30—28 X |
| 2,903,791 | 9/1959 | Walker | 30—155 |
| 3,089,239 | 5/1963 | Loda | 30—28 X |
| 3,180,025 | 4/1965 | Tsunemi | 30—28 |

FOREIGN PATENTS 503,260  12/1954  Italy.

WILLIAM FELDMAN, *Primary Examiner.*

R. V. PARKER, JR., *Assistant Examiner.*